United States Patent
Chen et al.

(10) Patent No.: US 9,380,133 B2
(45) Date of Patent: Jun. 28, 2016

(54) COMMUNICATION METHOD, APPARATUS AND SYSTEM

(71) Applicant: Huawei Technologies Co., Ltd., Shenzhen (CN)

(72) Inventors: Rui Chen, Shenzhen (CN); Wanhong Meng, Xi'an (CN); Youquan Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 14/313,793

(22) Filed: Jun. 24, 2014

(65) Prior Publication Data

US 2014/0307738 A1    Oct. 16, 2014

Related U.S. Application Data

(63) Continuation of application No. PCT/CN2013/072485, filed on Mar. 12, 2013.

(51) Int. Cl.
*H04L 29/06* (2006.01)
*H04L 12/24* (2006.01)
*H04L 29/08* (2006.01)
(Continued)

(52) U.S. Cl.
CPC ............ *H04L 69/22* (2013.01); *H04L 12/4625* (2013.01); *H04L 12/4637* (2013.01); *H04L 12/6418* (2013.01); *H04L 12/66* (2013.01); *H04L 41/0213* (2013.01); *H04L 61/103* (2013.01); *H04L 61/6022* (2013.01);
(Continued)

(58) Field of Classification Search
CPC .............. H04L 29/0653; H04L 29/06095; H04L 49/3009; H04L 49/309; H04L 45/742
See application file for complete search history.

(56) References Cited

U.S. PATENT DOCUMENTS 8,483,069 B1 * 7/2013 Bobade ............... H04L 43/0858
                                                                370/241
8,565,236 B2 * 10/2013 Shimada ............. H04L 12/4633
                                                                370/229

(Continued)

FOREIGN PATENT DOCUMENTS

CN    101515950 A    8/2009
CN    101552745 A    10/2009

OTHER PUBLICATIONS

Extended European Search Report received in European Application No. 13866496 dated Jul. 9, 2015, 8 pages.
(Continued)

*Primary Examiner* — Hassan Phillips
*Assistant Examiner* — Prenell Jones
(74) *Attorney, Agent, or Firm* — Slater Matsil, LLP

(57) ABSTRACT

Embodiments of the present invention provide a communication method, apparatus, and system, where the communication method includes: receiving a packet, encapsulating all or a part of the packet into an Ethernet operation, administration and maintenance packet, and then, according to a corresponding relationship between a port that receives the packet and a corresponding maintenance entity group end point, sending the encapsulated packet to an apparatus that includes the maintenance entity group. The communication method, apparatus, and system provided by the embodiments of the present invention implement IP address-based communication and management for a device that does not have an IP address by means of port mapping and packet encapsulation.

20 Claims, 8 Drawing Sheets

(51) Int. Cl.
- *H04L 12/66* (2006.01)
- *H04L 29/12* (2006.01)
- *H04L 12/46* (2006.01)
- *H04L 12/64* (2006.01)
- *H04Q 11/00* (2006.01)

(52) U.S. Cl.
CPC ............ *H04L61/6063* (2013.01); *H04L 67/28* (2013.01); *H04Q 11/0001* (2013.01)

(56) References Cited

U.S. PATENT DOCUMENTS

| | | | |
|---|---|---|---|
| 9,172,530 B2* | 10/2015 | Lee | H04L 9/0816 |
| 9,203,549 B2* | 12/2015 | Holness | H04L 43/0811 |
| 2004/0184408 A1 | 9/2004 | Liu et al. | |
| 2005/0265340 A1 | 12/2005 | Wu et al. | |
| 2006/0159008 A1* | 7/2006 | Sridhar | H04L 12/2881 370/216 |
| 2007/0140126 A1* | 6/2007 | Osswald | H04L 41/06 370/236.2 |
| 2008/0285466 A1 | 11/2008 | Salam et al. | |
| 2010/0020802 A1* | 1/2010 | Willis | H04L 45/742 370/395.1 |
| 2011/0286324 A1* | 11/2011 | Bellagamba | H04L 41/0677 370/219 |

OTHER PUBLICATIONS

FreeBSD System Manager's Manual, FreeBSD 10.2, FTP-PROXY (8), Feb. 26, 2008.

* cited by examiner

| Field | Start byte |
|---|---|
| Destination mac | 1 |
| Source mac | 7 |
| 802.1Q EtherType (0x8100) | 13 |
| VLAN tag | 15 |
| CFM EtherType (0x8902) | 17 |
| MD LEVEL+Version | 19 |
| OpCode | 20 |
| Tag | 21 |
| First TLV Offset | 22 |
| Packet sequence number | 23 |
| Packet TLV that needs to be encapsulated | 27 |
| End TLV | First TLV Offset+23 |

FIG. 3

COMMUNICATION METHOD, APPARATUS AND SYSTEM

This application is a continuation of International Application No. PCT/CN2013/072485, filed on Mar. 12, 2013, which is hereby incorporated by reference in its entirety.

TECHNICAL FIELD

The present invention relates to the field of communication technologies, and in particular, to a communication method, apparatus and system.

BACKGROUND

In a network architecture in the prior art, connections of networks, exchange of information, and monitoring and management in networks largely depend on an Internet Protocol (IP) address of a device. A user uses an IP address to access a network, where the IP address is allocated to the user by a server in the network based on the IP protocol. Information is exchanged between different users by using their respective IP addresses, and an administrator in the network uses IP addresses to monitor and manage the network.

However, as required by flat management, network devices connected to an access device in a network become smaller in size and keeps growing in number. If an IP address is allocated to each network device, limited IP address resources will become deficient. Therefore, operators put forward a network architecture in which an IP address is not configured for a network device connected to an access device in a network, so as to save IP address resources. Connections of networks, exchange of information, and monitoring and management of networks in the prior art are performed mostly based on IP addresses. Consequently, a network device that does not have an IP address and is connected to an access device in a network can hardly implement IP address based-communication.

SUMMARY OF THE INVENTION

In view of this, embodiments of the present invention provide a communication method, apparatus, and system to facilitate IP address-based communication implemented by a network device that does not have an IP address and is connected to an access device in a network.

According to a first aspect, an embodiment of the present invention provides a communication method adapted for a communication system that includes a first apparatus, a second apparatus, and a third apparatus. In this example, the method includes receiving, by the second apparatus, a first packet that carries a port number corresponding to an Ethernet maintenance entity group end point (Maintenance Entity Group End Point, MEP) address. The first apparatus is connected to the third apparatus through the second apparatus. The first packet is a transport layer protocol packet from the third apparatus, and the port number is a port number of a destination port of the first packet. The MEP address is a MEP address of a MEP on the first apparatus. The communication method further comprises encapsulating, by the second apparatus, a part or all of content of the first packet into a second packet. The second packet is an Ethernet operation, administration and maintenance (Operation, Administration and Maintenance, OAM) packet. The method further comprises sending, by the second apparatus, the second packet to the MEP on the first apparatus according to the port number and a corresponding relationship between the MEP address and the port number.

With reference to the first aspect, in a first possible implementation manner, before receiving the first packet, the second apparatus creates the corresponding relationship between the MEP address and the port number. Specifically, the second apparatus creates a corresponding relationship between the MEP address and a MEP identifier of the MEP, and the second apparatus creates a corresponding relationship between the MEP identifier and the port number.

With reference to all the above implementation manners, in a second possible implementation manner, the second apparatus receives a third packet returned as a response from the first apparatus. The third packet is an Ethernet OAM packet. The second apparatus encapsulates a part or all of content of the third packet into a fourth packet, and sends the fourth packet to the third apparatus.

With reference to all the above implementation manners, in a third possible implementation manner, the first packet carries a Telnet protocol Telnet packet or carries a Simple Network Management Protocol (Simple Network Management Protocol, SNMP) packet.

Alternatively, the first packet carries a File Transfer Protocol (File Transfer Protocol, FTP) packet. In an embodiment, before the second apparatus receives the first packet from the third apparatus, the communication method further includes: sending, by the second apparatus, a fifth packet carrying the port number and an IP address of the third apparatus to the first apparatus, where the fifth packet is an OAM packet; receiving, by the second apparatus, a sixth packet carrying an FTP active mode command from the first apparatus, where the sixth packet is an OAM packet, and the active mode command includes the port number and the IP address of the third apparatus; and encapsulating, by the second apparatus, the active mode command into a seventh packet, and sending the seventh packet to the third apparatus over a created FTP command link, so as to create an FTP data link.

Alternatively, the first packet carries a File Transfer Protocol FTP packet; before the second apparatus receives the first packet from the third apparatus, the communication method further includes: receiving, by the second apparatus, an eighth packet carrying an FTP passive mode command from the first apparatus, where the eighth packet is an OAM packet; encapsulating, by the second apparatus, the passive mode command into a ninth packet, and sending the ninth packet to the third apparatus over a created FTP command link; receiving, by the second apparatus, a tenth packet returned as a response from the third apparatus, where the tenth packet carries a data port number, and the tenth packet is an FTP packet; encapsulating, by the second apparatus, the tenth packet into an eleventh packet, and sending the eleventh packet to the first apparatus, where the eleventh packet is an OAM packet; receiving, by the second apparatus, a twelfth packet returned as a response from the first apparatus, and obtaining the data port number from the twelfth packet, where the twelfth packet is an OAM packet; and creating, by the second apparatus, an FTP data link by using the data port number and the port number as an FTP server port number and an FTP client port number respectively, and by using an Internet Protocol IP address of the second apparatus as an FTP client IP address.

According to a second aspect, a communication apparatus is provided. The communications apparatus includes a receiving unit configured to receive a packet, and a processing unit configured to receive a first packet that carries a port number corresponding to a stored Ethernet maintenance entity group end point MEP address The first packet is a transport layer protocol packet from the receiving unit, and the port number is a port number of a destination port of the first packet. The processor is further configured to encapsulate a part or all of content of the first packet into a second packet. The second packet is an Ethernet operation, administration and maintenance OAM packet. The processor is further configured to set a destination address of the second packet as the MEP address according to the port number and a corresponding relationship between the MEP address and the port number. The apparatus further includes a sending unit, configured to send the packet that comes from the processing unit.

With reference to the second aspect, in a first possible implementation manner, the processing unit is further configured to create the corresponding relationship between the MEP address and the port number. Alternatively, the processing unit is further configured to create a corresponding relationship between the MEP address and a stored MEP identifier, and create a corresponding relationship between the MEP identifier and the port number.

With reference to all the above implementation manners of the second aspect, in a second possible implementation manner, the processing unit is further configured to encapsulate a part or all of content of a third packet in response to the second packet into a fourth packet, and set a destination address of the fourth packet as a source address of the first packet.

With reference to all the above possible implementation manners of the second aspect, the first packet carries a Telnet protocol Telnet packet or carries a Simple Network Management Protocol SNMP packet. Alternatively, the first packet carries a Simple Network Management Protocol FTP packet; and the processing unit is further configured to obtain a data port number from an OAM packet from the receiving unit, and create an FTP data link by using the data port number and the port number as an FTP server port number and an FTP client port number respectively.

According to a third aspect, another communication apparatus is provided. In this example, the communication apparatus includes one or more receiving devices configured to receive a packet, and a processor coupled with the one or more receiving devices. The processor is configured to receive a first packet that carries a port number corresponding to a stored Ethernet maintenance entity group end point MEP address. The first packet is a transport layer protocol packet from the one or more receiving devices, and the port number is a port number of a destination port of the first packet. The processor is further configured to encapsulate a part or all of content of the first packet into a second packet. The second packet is an Ethernet operation, administration and maintenance OAM packet. The processor is further configured to set a destination address of the second packet as the MEP address according to the port number and a corresponding relationship between the MEP address and the port number. The apparatus further includes one or more sending devices coupled to the processor. The one or more sending devices are configured to send the packet that comes from the processor.

With reference to the third aspect, in a first possible implementation manner, the processor is further configured to create the corresponding relationship between the MEP address and the port number. Alternatively, the processor is further configured to create a corresponding relationship between the MEP address and a stored MEP identifier, and create a corresponding relationship between the MEP identifier and the port number.

With reference to all the above implementation manners of the third aspect, the processor is further configured to encapsulate a part or all of content of a third packet in response to the second packet into a fourth packet, and set a destination address of the fourth packet as a source address of the first packet.

With reference to all the above possible implementation manners of the third aspect, the first packet carries a Telnet protocol Telnet packet or carries a Simple Network Management Protocol SNMP packet. Alternatively, the first packet carries a File Transfer Protocol FTP packet; and the processor is further configured to obtain a data port number from an OAM packet from the one or more receiving devices, and create an FTP data link by using the data port number and the port number as an FTP server port number and an FTP client port number respectively.

In a fourth aspect, a communication system is further provided, where the communication system includes a first apparatus, a second apparatus, and a third apparatus, and the first apparatus is connected to the third apparatus through the second apparatus; the second apparatus is configured to receive a first packet that carries a port number corresponding to a stored Ethernet maintenance entity group end point MEP address, where the first packet is a transport layer protocol packet from the third apparatus, and the port number is a port number of a destination port of the first packet; encapsulate a part or all of content of the first packet into a second packet, where the second packet is an Ethernet operation, administration and maintenance OAM packet; and send the second packet to the first apparatus according to the port number and a corresponding relationship between the MEP address and the port number; and the first apparatus is configured to receive the second packet and obtain the content encapsulated in the second packet.

With reference to the fourth aspect, the second apparatus is further configured to create the corresponding relationship between the MEP address and the port number according to an instruction from the third apparatus before the second apparatus receives the first packet from the third apparatus. Alternatively, the second apparatus is further configured to: according to an instruction from the third apparatus, create a corresponding relationship between the MEP address and a stored MEP identifier, and create a corresponding relationship between the MEP identifier and the port number.

The communication method, the apparatus, and the system provided by the embodiments of the present invention can implement communication between a device that does not have an IP address and a communication network by using a fixed mapping relationship between a transport layer protocol port and the device that does not have an IP address and by encapsulating and decapsulating an Ethernet OAM packet, without requiring to configure an IP address for a network device connected to an access device in a network, which saves limited IP address resources and avoids compatibility problems.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 3 is a schematic diagram of an OAM packet format for encapsulating a packet according to an embodiment of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
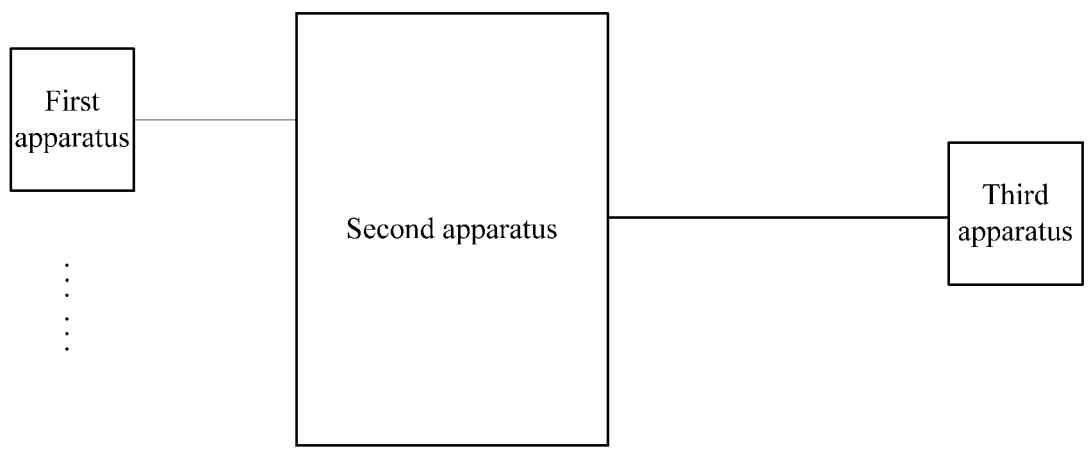
FIG. 1 is a network architecture diagram of an access network.

FIG. 1 is a network architecture diagram of an access network in the prior art. The communication method, apparatus, and system provided by the embodiments of the present invention are applied in the network architecture. As shown in FIG. 1, one or more first apparatuses that do not have an IP address are connected to a third apparatus through a second apparatus, where the connection may be a direct connection or an indirect connection. For example, another network device such as a relay device, a switching device, and a convergence device may further be connected between the second apparatus and the third apparatus. The first apparatus may be various devices such as an optical network unit (ONU), a multi-dwelling unit (MDU), a multi-tenant unit (MTU), a digital subscriber line access multiplexer (DSLAM), a switch, a distribution point unit in a fiber to the drop point (Fiber to the drop point, FTTdp) scenario, and so on. The second apparatus has an IP address, and may be a network device such as a digital subscriber line access multiplexer (DSLAM), a switch, or an optical line terminal (OLT). In the network architecture in FIG. 1, an IP address is not configured for the first apparatus. It should be noted that, if an IP address is configured for the first apparatus, the communication method, communication apparatus, and communication system provided by the embodiments of the present invention are also feasible, and the implementation method is the same as the method applied when an IP address is not configured for the first apparatus.

Because the second apparatus has an IP address and supports the Transmission Control Protocol/Internet Protocol (TCP/IP), the third apparatus in the network can configure, manage, and maintain the second apparatus by using various application layer protocols of the Internet, such as the Telnet protocol, the File Transfer Protocol (FTP), and the Simple Network Management Protocol (SNMP). However, for the first apparatus that does not have an IP address, which is attached to the second apparatus, because the first apparatus does not have an IP address is unable to use the application layer protocols such as Telnet, FTP, and SNMP, it is difficult to set, manage, and maintain the first apparatus. To solve such a problem, the second apparatus is used as a proxy in the embodiment of the present invention, and the third apparatus is allowed to use various application layer Internet protocols to access the first apparatus connected to the third apparatus.

Figure 2:
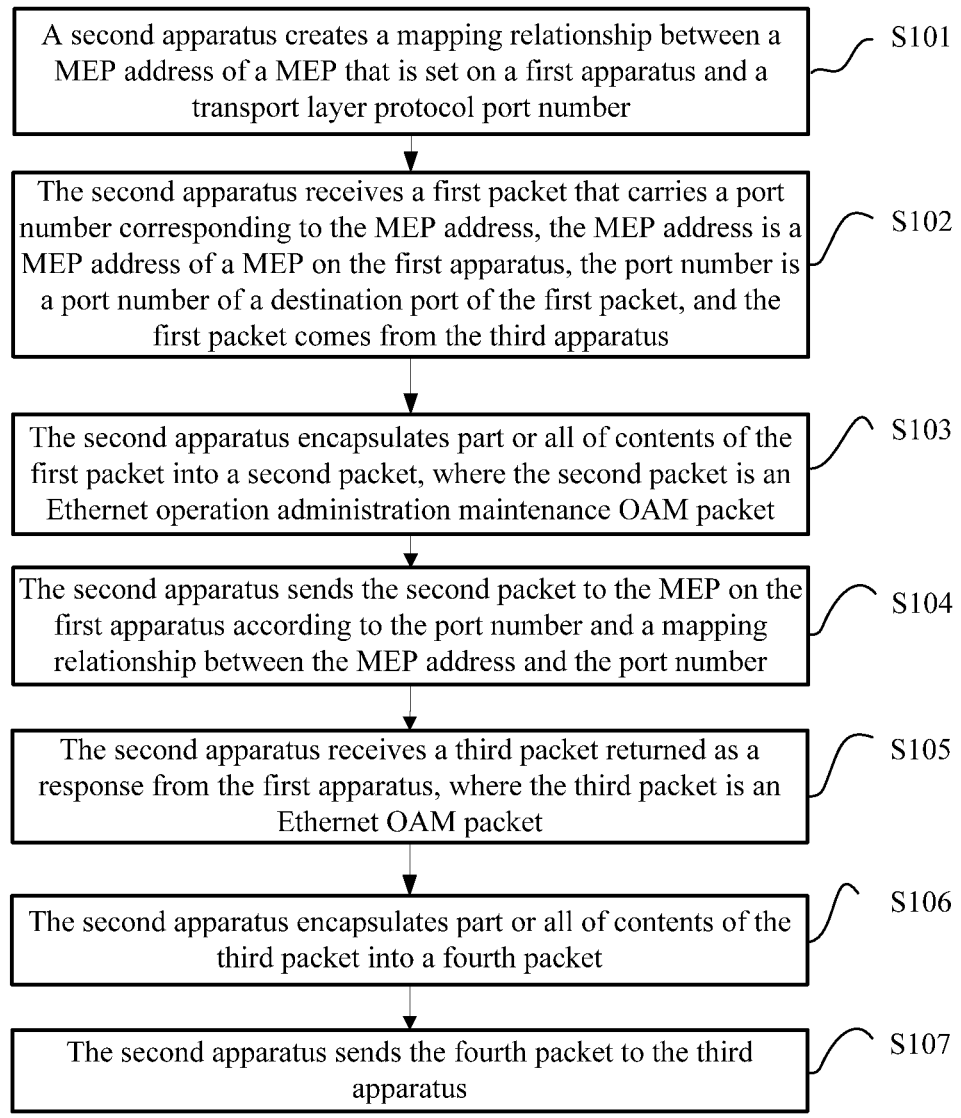
FIG. 2 is a schematic flowchart of a communication method according to an embodiment of the present invention.

Specifically, as shown in FIG. 2, a communication method provided by an embodiment of the present invention includes the following steps.

Step S101: Optionally, the second apparatus creates a corresponding relationship between a transport layer protocol port number and a MEP address of an Ethernet maintenance entity group end point (MEP) that is set on the first apparatus. The MEP address may refer to a MAC address at the location of the MEP. When the packet can be sent to the MEP by using a multicast or multicast address, the broadcast address or multicast address may also be regarded as the MEP address of the MEP; and when the packet or message can be sent to the MEP by using another address, the other address may also be the MEP address of the MEP, which is not limited in the embodiments of the present invention. The corresponding relationship is generally reflected by a corresponding relationship between the MEP address and the port number of the transport layer protocol port. If the corresponding relationship between the MEP address of the MEP and the port number exists, for example, if the corresponding relationship is static and is preset, this step is omissible. The instruction of creating the corresponding relationship may come from the third apparatus or a network manager, or may be input by using a command line.

The MEP is created on both the first apparatus and the second apparatus, and the two apparatuses can communicate with each other by using Ethernet packets. The method for creating the MEP on a corresponding port on the first apparatus and the second apparatus may be: using a link layer discovery protocol to perform neighbor discovery first and then create a corresponding MEP automatically, or creating it in advance before the corresponding apparatus is shipped from a factory.

Specifically, by using the link layer discovery protocol, the second apparatus discovers that the first apparatus that does not have an IP address is connected to a port P of the second apparatus, and therefore, a MEP 1 is automatically generated on a virtual local area network (VLAN) N reserved by the port P. The MEP 1 sends a continuity check message (CCM) through the port P. After the CCM arrives at the attached first apparatus, the first apparatus creates a corresponding MEP 2 at the reserved VLAN N by using the received CCM, and sends the CCM to the side of the second apparatus. After the MEP 1 receives the packet from the MEP 2, the link is created.

In the case of pre-creation before shipment from the factory, a MEP 2 that works in a specified reserved VLAN N may be pre-created on all apparatuses that do not have an IP address. After the corresponding second apparatus is started, the corresponding MEP is also created on the specified reserved VLAN N respectively at each port to which the apparatus that does not have an IP address is attached. The link is regarded to be created if the MEP 1 on the OLT receives a CCM packet of the MEP 2 on the specified reserved VLAN N and a remote defect indication (Remote Defect Indication, RDI) field in the CCM packet is 0.

For ease of description, all MEPs mentioned hereinafter refer to a MEP that is set on the first apparatus. The corresponding relationship between the MEP address and a protocol port may be direct, that is, a Media Access Control (MAC) address of the MEP corresponds to the port number of the protocol port directly; or, the corresponding relationship may be indirect, for example, the protocol port corresponds to the MEP identifier, and the MEP identifier corresponds to the MAC address of the MEP. The MEP identifier may be one of the following or any combination thereof: a MEP sequence number, a MEP identity, a VLAN identifier, and other MEP identifiers. In summary, the second apparatus may use the identifier to identify the MEP, and use the identifier to obtain the destination address that should be written in the packet destined for the MEP. That is, this identifier is unique to the second apparatus, and corresponds to the MAC address of the MEP. It should be noted that the MAC address may be a MAC address of a port of the first apparatus where the MEP is located. If a packet can also be sent to the MEP successfully by using the corresponding multicast or broadcast address, the MEP address may also refer to the corresponding multicast or broadcast address.

The transport layer protocol may be TCP, or a file User Datagram Protocol (UDP), or another transport layer protocol. The transport layer protocol port refers to an abstract communication port allocated to the second apparatus. For the TCP protocol port, when the apparatus sends a packet by using the protocol port, the port number of the protocol port is used as a port number of a source port of the packet, and filled into the packet that needs to be sent; and, when packets pass through the protocol packet receiving port, those packets with the port number of the destination port being the same as the port number of the protocol port are received. It is the same with the UDP protocol port. It should be noted that, because no connection needs to be created when the packet is transmitted over the UDP protocol, the packet is transmitted in a unidirectional manner. If a packet needs to be sent to a peer side by using a same protocol port, the port number of the peer port needs to be obtained first, and, when the packet is being sent to the peer side, the obtained port number is used as the port number of the destination port of the packet to be sent. Of course, the transport layer protocol packet destined for the second apparatus and based on an IP address generally finds the second apparatus first according to the IP address, and then finds the corresponding receiving port according to the transport layer protocol port number.

The second apparatus creates a corresponding relationship between a transport layer protocol port number and a MEP address that is set on the first apparatus. Specifically, a mapping relationship between the MEP address and the port number of the transport layer protocol port is set and stored on the second apparatus, where the mapping relationship may be reflected by one or more corresponding relationship tables. The mapping relationship may be a direct mapping between the port number and the MEP address, or may be an indirect mapping. For example, the corresponding relationship may be a one-to-one mapping relationship between the port number and another parameter, where the parameter is also in a one-to-one mapping relationship with the MEP address. In a scenario, the second apparatus may create a corresponding relationship between the MEP address and the MEP identifier, and a corresponding relationship between the MEP identifier and the port number. Specifically, for example, the second apparatus may create a socket (Socket) first, where the socket includes the IP address of the corresponding interface on the second apparatus and the transport layer protocol port number, that is, the socket corresponds to the port number. Meanwhile, the socket corresponds to the MEP address. For example, a corresponding relationship may be created between a socket ID and the MEP address, or a corresponding relationship may be created between the socket ID and the MEP identifier, while the MEP identifier corresponds to the MEP address. Of course, at the time of creating the socket, in addition to specifying the corresponding IP address and port number, the corresponding transport layer protocol needs to be specified, which is not repeated here any further.

Step S102: The second apparatus receives a first packet that carries a port number corresponding to an Ethernet maintenance entity group end point MEP address, where the first packet is a transport layer protocol packet, the MEP address is a MEP address of a MEP on the first apparatus, the port number is a port number of a destination port of the first packet, and the first packet comes from the third apparatus. The second apparatus may receive the first packet in the following way. First, at an IP address that belongs to this apparatus, receiving a packet destined for this IP address. Then processing the packet correspondingly according to the port number of the destination port that is included in the received packet. If a corresponding relationship between the port number in the packet and the MEP address is discovered, processing the packet according to the communication method disclosed in the embodiment of the present invention. The second apparatus may also receive the first packet in the following way: creating a socket to monitor the protocol port to dedicatedly receive the packet that carries the corresponding port number among the packets, where the protocol port number refers to the destination port number of the transport layer protocol packet; and if no corresponding MEP address corresponds to the port number carried in the received packet, processing the packet in other ways, for example, processing the packet at a corresponding local protocol stack.

Step S103: The second apparatus encapsulates a part or all of content of the first packet into a second packet, where the second packet is an Ethernet operation, administration and maintenance OAM packet.

After receiving the packet that carries the corresponding port number, the second apparatus may encapsulate the first packet into the second packet directly. If one OAM is not enough for the encapsulation, the packet may be fragmented and encapsulated in multiple OAM packets. Preferably, the first packet may be processed first, for example, stripped of a corresponding transport layer protocol packet header to obtain a corresponding application layer packet through parsing, and then the corresponding application layer packet is encapsulated into the OAM packet at a single attempt or after being fragmented. Further, for example, in the Telnet protocol, the second apparatus may send the application layer packet obtained through parsing to the protocol stack for processing, and encapsulate a user command carried in the application layer packet into the OAM packet. The first packet may carry a File Transfer Protocol FTP packet or a Telnet packet, or a Simple Network Management Protocol SNMP packet, or other application layer packets.

Optionally, after the corresponding application layer packet is obtained through parsing, it is appropriate to encapsulate only the specific application layer packet such as the FTP packet, while other application layer packets are discarded or processed in other ways. Optionally, the socket may be used to distinguish the corresponding application layer packet.

Specifically, as shown in FIG. 3, which is a standard format of an Ethernet OAM packet, where the content on the left side shows the structure of the OAM packet and the content on the right side shows the position of a start byte corresponding to the content filled on the left side. The format of the OAM packet on the left side is defined by IEEE 802.1q and IEEE 802.1ag. The specific meanings of all parts are not detailed here any further. The encapsulation mentioned in the embodiments of the present invention refers to encapsulating desired content into an idle field or a custom field of the OAM packet. Preferably, the desired content may be encapsulated into a type, length, value TLV field of the OAM packet. That is, the field in the second row from the bottom in FIG. 3 is filled with the corresponding content that needs to be encapsulated. In this embodiment, the content is a part or all of the corresponding first packet, or a part or all of the application layer packet obtained by parsing the first packet, or the content carried in the application layer packet in the first packet.

Step S104: The second apparatus sends the second packet to the MEP on the first apparatus according to the port number and a corresponding relationship between the MEP address and the port number. Specifically, according to the port number, the second apparatus queries the corresponding relationship between the MEP address of the MEP on the first apparatus and the transport protocol layer port number to obtain the MEP address corresponding to the port number, where the corresponding relationship is (created and) stored by the second apparatus, and sends the second packet to the MEP corresponding to the port number.

The second apparatus monitors a corresponding port and receives a packet from the port. Optionally, a corresponding MEP identifier is then found according to the port number in a corresponding relationship table or a mapping relationship table of the corresponding port number and the MEP identifier. Because the MEP identifier corresponds to a final address of the MEP, the MAC address of the MEP can be further obtained according to the identifier, and then the MAC address is used as the destination address of the second packet, so that the second packet is sent to the first apparatus. In a case that the port number is directly mapped to the MEP address, the MEP address may be obtained directly according to the port. Preferably, the operation may be implemented by using a socket, and the port may be monitored by using a socket function. The MEP identifier is found according to the port number of the port, and the MEP address is further obtained, or the MEP address is obtained directly.

The MEP address may be a MAC address of the port of the MEP on the first apparatus, and therefore, the second packet that uses the MAC address as a destination address may be delivered to the first apparatus directly. The MEP address may also be a multicast or broadcast address. In a point-to-point VLAN, because only the MEP on the first apparatus in a VLAN corresponds to the second apparatus, the multicast or broadcast packet of the second apparatus in the VLAN can be received by only the MEP on the first apparatus, which also achieves the objective of the embodiments of the present invention. Of course, if the VLAN is not a point-to-point VLAN, a special identifier may be added in the multicast or broadcast packet for distinguishing. Therefore, after receiving the second packet, the MEP on the first apparatus can know that the packet is destined for the MEP and process the packet, and other entities that receive the packet can discard the packet directly. The special identifier may be user-defined. Preferably, a MEP identity (MEP ID) may be used as the special identifier.

Step S105: The second apparatus receives a third packet returned as a response from the first apparatus, where the third packet is an Ethernet OAM packet. After receiving the second packet, the first apparatus parses the second packet to obtain the corresponding content. If the content is encapsulated in a TLV field of the second packet and if the content encapsulated in the TLV field of the second packet is a complete first packet or a complete application layer application that is obtained by parsing the first packet, the packet obtained through parsing is sent to a corresponding protocol stack for processing, and a response OAM packet is generated. The response content is encapsulated into the corresponding OAM packet at a single attempt or after being fragmented, and sent to the second apparatus. If the content obtained by the first apparatus by parsing the second packet is a part of the content of the first packet that is fragmented, the corresponding packet is processed after the received fragments are reassembled, and then the response OAM packet is generated.

As regards how the second apparatus determines that the received packet is a response packet, optionally, all the OAM packets from the MEP of the first apparatus may be set as the corresponding response packets, or it may be specified that a corresponding identifier is added in the response OAM packet, or it may be determined according to the specific content or the type of packet obtained by parsing the TLV field whether the packet is a response packet. The embodiments of the present invention do not limit the specific way of determination.

Step S106: The second apparatus encapsulates a part or all of content of the third packet into a fourth packet. The second apparatus may encapsulate the entire third packet into the fourth packet, or may obtain the corresponding content by parsing the corresponding field such as the TLV field in the third packet, and then encapsulate the all or fragments of the content obtained through parsing into the corresponding packet. The fourth packet here may be a transport layer packet corresponding to the first packet, or may be an application layer packet. Of course, the application layer is eventually encapsulated as a transport layer packet before it can be sent.

Step S107: The second apparatus sends the fourth packet to the third apparatus. If the fourth packet is already a transport layer packet, the packet can be sent directly; and, if the fourth packet is an application layer packet, the packet needs to be encapsulated as a transport layer packet before it is sent. Optionally, the second apparatus may obtain the IP address and the port number of the third apparatus according to the corresponding relationship between the MEP address and the port number, and therefore, can send the fourth packet according to the obtained IP address and port number. For example, this method is applicable when the transport layer protocol is TCP. Optionally, the second apparatus may also record a source IP address and a source port number of the first packet when receiving the first packet. When receiving the third packet returned as a response from the first apparatus, the second apparatus encapsulates the content of the third packet as a fourth packet, and sends the fourth packet by using the recorded source IP address and source port of the first packet as a destination IP address and a destination port of the fourth packet. For example, this method is applicable when the transport layer protocol is UDP. It should be noted that the embodiments of the present invention do not limit how the second apparatus sends the fourth packet to the third apparatus, and persons skilled in the art may make a corresponding extension on this basis.

It should be noted that the above steps S105, S106, and S107 are optional steps, and are performed only when the first apparatus is required to make a response, and are omissible when the third apparatus does not require the first apparatus to make a response.

The type of the OAM packet mentioned above, namely, the first packet and the third packet, is optional. The embodiments of the present invention may be implemented by extending a standard OAM packet properly. For example, a continuity check message (CCM) packet, a loopback message (LBM), a loopback reply (LBR), a link trace message (LTM), a link reply message (LTR), and so on. Preferably, the LBM is combined with the LBR. For example, the LBM packet is used as a first packet, and the LBR is used as a response third packet.

The following expounds the embodiments of the present invention in more detail with reference to a specific instance. In a scenario, an optical line terminal (Optical Line Terminal, OLT) is applied. The OLT here is only an example, and another network access device may be applied instead. The OLT is connected to one or more optical network units (Optical Network Unit, ONU) or optical network terminals (Optical Network Terminal, ONT) that have no IP address, where the OLT is connected to an IP network. A network manager or a user in the IP network wants to use the Telnet protocol to manage and maintain an ONU or ONT (for ease of description, both are referred to as ONU hereinafter) that does not have an IP address, and the following method may be applied.

The user or the network management device (equivalent to the third apparatus) may use a query command to obtain the ONU (equivalent to the first apparatus) of the current OLT (equivalent to the second apparatus), where the ONU does not have an IP address. Then, to log in to the ONU that does not have an IP address directly through Telnet, if the sequence number of the ONU is 5/1, the sequence number corresponds to the MEP address on the ONU.

The user or network management device may send a command to the OLT, where the command is to map a Telnet service of the ONU numbered 5/1 to a port 10023 (the port number is optional) of an IP address x (the IP address is an IP address of a layer-3 interface on the OLT, and, unless otherwise specified, the IP address is an IP address of the first layer-3 interface by default) on the OLT. After receiving the command, the OLT maps the Telnet service of the ONU that does not have an IP address to the port 10023 on the OLT. Specifically, the mapping here refers to creating a corresponding relationship between the MEP address on the ONU and the port 10023, where the MEP may be denoted by the sequence number of the ONU, and the sequence number is in a corresponding relationship with the MEP address. After the OLT executes the command, the user or network management device creates a TCP/IP connection with the OLT. After the connection succeeds, the user or network management device may directly use the Telnet protocol over the TCP to maintain and manage the ONU that does not have an IP address, which produces an operation effect that is the same as the operation effect of using the Telnet to directly log in to the device that does not have an IP address.

Figure 4:
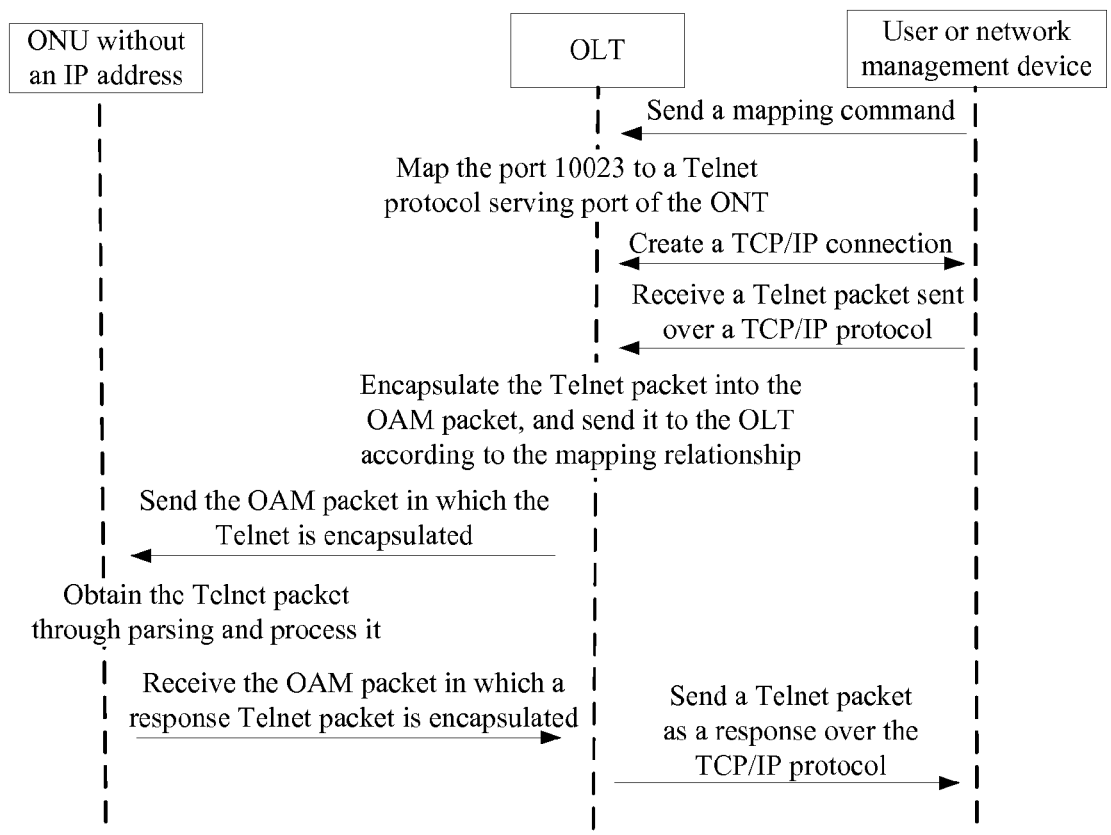
FIG. 4 is a signaling interaction diagram for implementing the Telnet protocol according to an embodiment of the present invention.

Specifically, as shown in FIG. 4, first, the OLT monitors the port 10023 by acting as a proxy device, and receives a packet sent by the user or network management device, where the packet carries the port number 10023 of the destination port. Because the port is in a corresponding relationship with the MEP address of the ONU that does not have an IP address, the OLT knows that the packet is actually destined for the ONU that does not have an IP address. Secondly, the OLT encapsulates the Telnet packet carried in the TCP packet received from the port 10023 into an OAM packet. Here, a process of parsing the TCP packet is actually included. Of course, the entire TCP packet that includes the Telnet packet may also be encapsulated into the OAM packet directly. When an OAM packet is not enough for encapsulating the entire TCP packet or Telnet packet, the packet may be fragmented and sent by using a fragmentation technology. Then, the OLT sends the OAM packet to the ONU that does not have an IP address according to the port number of the destination port of the received TCP packet and a corresponding relationship between the port number and the MEP address of the MEP on the ONU. Specifically, according to the port number, the OLT searches one or more corresponding relationship tables, obtains the corresponding MEP address, uses the obtained MEP address as the destination address of the OAM packet, and then sends the OAM packet. After receiving the OAM packet, the ONU that does not have an IP address parses the packet to obtain the corresponding Telnet packet, sends the Telnet packet to a protocol stack for processing, generates a response Telnet packet, encapsulates the response Telnet packet into the OAM packet, and sends the OAM packet to the OLT. After receiving the OAM packet in which the response Telnet is encapsulated, the OLT recognizes that the packet is a packet in response to the OAM packet that is previously sent by the OLT to the ONU, and therefore, the OLT parses the packet to obtain the Telnet packet, encapsulates the obtained Telnet packet into a TCP packet, and sends the TCP packet to the user or network management device. In addition, if the user or network management device does not need to directly log in to the ONU that does not have an IP address and is numbered 5/1, a demapping command may be used to stop mapping the Telnet service of the ONU that does not have an IP address to the port 10023 on the OLT. By using a fixed mapping relationship between the transport layer protocol port and the device that does not have an IP address and by encapsulating and decapsulating an Ethernet OAM packet, the user or network management device in the IP network can achieve Telnet protocol-based maintenance and management such as remote configuration, query, and debugging for the device that does not have an IP address and is connected to the access device.

In another scenario, the embodiment of the present invention may be used to implement the FTP service of the device that does not have an IP address and is connected to the access device.

The FTP protocol needs to use two ports: a data port and a command port. Generally, the two ports are 21 (the command port) and 20 (the data port). The FTP works in two modes: an active mode and a passive mode. In the FTP of the active mode, a client is connected from any non-privileged port N (N>1024) to the command port of the FTP server, that is, the port 21. Then the client starts to monitor a port N+1 and sends an FTP PORT command to the FTP server. After receiving the PORT command as an active mode command, the FTP server gets connected from its own data port (20) to the data port (N+1) specified by the client. In the FTP of the passive mode, the creation of both a command link and a data link is initiated by the client. First, the client opens any two non-privileged local ports (N>1024 and N+1). The first port is connected to the port 21 of the FTP server to create a command link. Then the client sends a PASV command to the FTP server. After receiving the PASV command as a passive mode command, the FTP server starts any non-privileged port (P>1024), and notifies the port to the client. Finally, the client initiates a connection from the local port N+1 to the port P of the FTP server to create a data link.

Figure 5:
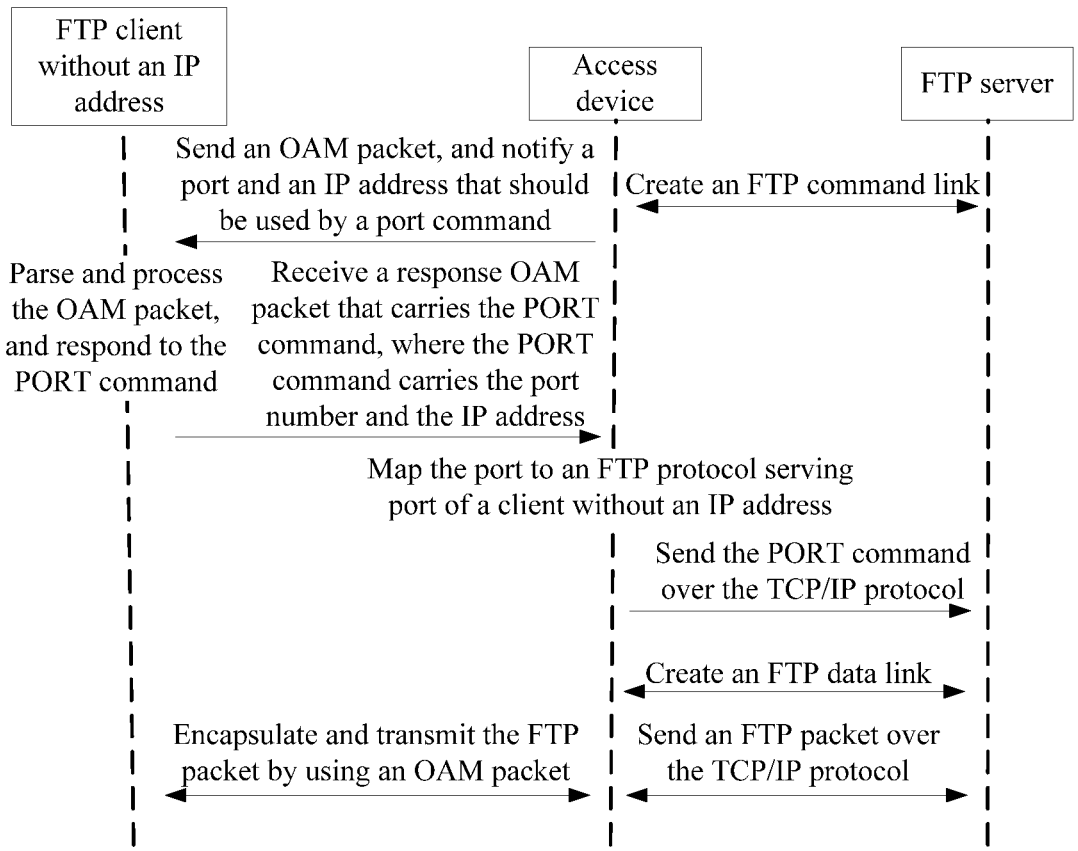
FIG. 5 is a signaling interaction diagram for implementing an active mode of the FTP protocol according to an embodiment of the present invention.
Figure 6:
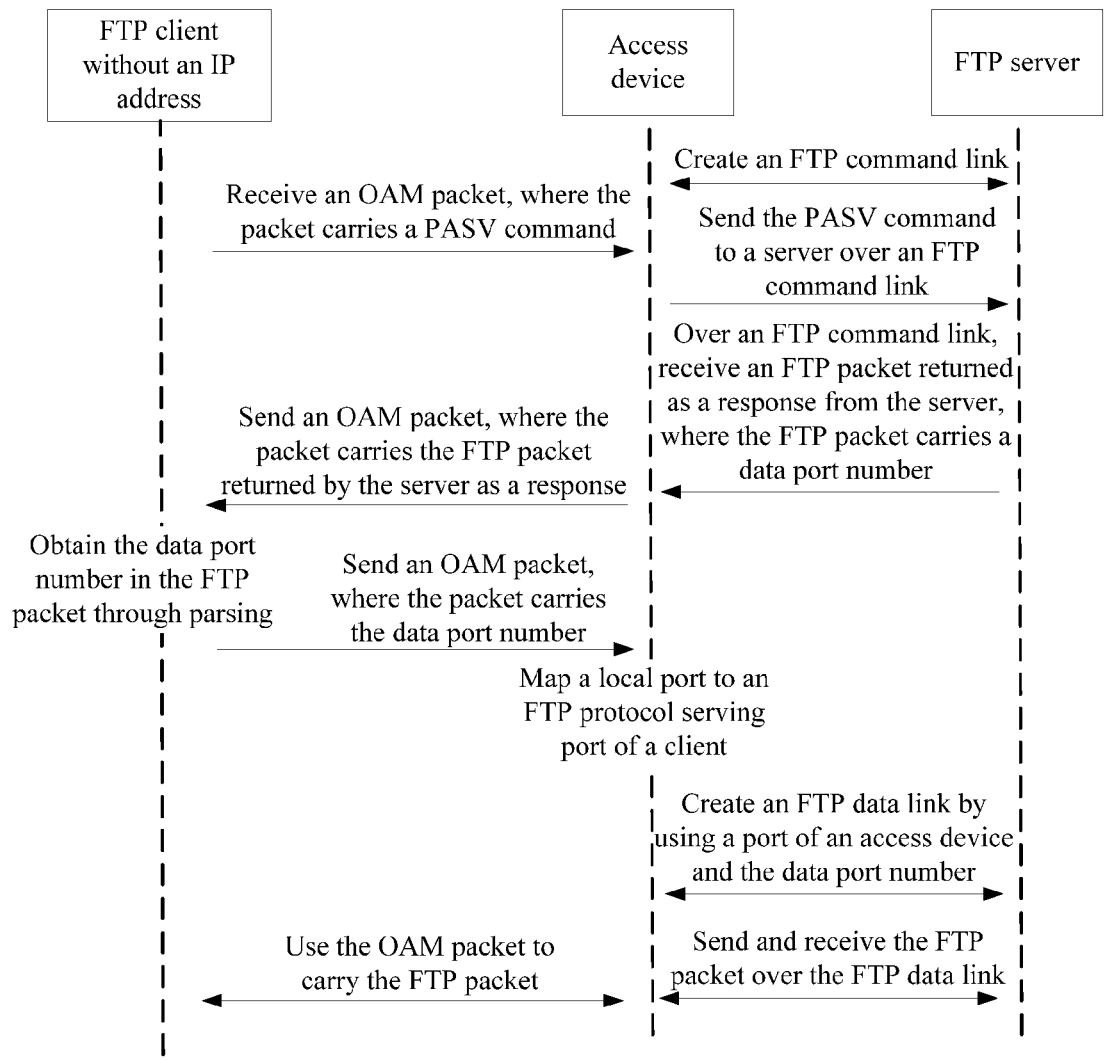
FIG. 6 is a signaling interaction diagram for implementing a passive mode of the FTP protocol according to an embodiment of the present invention.

The FTP protocol is a TCP-based service, and the TCP is based on an IP address. Therefore, a device that does not have an IP address and is connected to the access device is unable to implement the FTP service. In this embodiment, as shown in FIG. 5, the FTP client that does not have an IP address and is connected to the access device is connected to the FTP server device through the access device, and the access device acts as a proxy to exchange FTP packets between the FTP client and the FTP server. The access device creates an FTP command link to the FTP server first, the port used by the access device is a port N that is allocated randomly, and the link is a TCP connection. The access device sends an OAM packet to the FTP client, where a TLV field of the OAM packet carries the port number N+1 and the IP address of the FTP server. After parsing the received OAM packet, the FTP client sends the packet to an FTP protocol stack of the FTP client and generates a PORT command, where a port and an IP address used by the PORT command are the port N+1 notified by the access device and the IP address of the FTP server respectively. The FTP client encapsulates the PORT command into the TLV field of the OAM packet, and sends the OAM packet to the access device. After receiving the OAM packet, the access device directly encapsulates the content in the TLV field of the OAM packet and sends it to the FTP server device over a command link, and creates an FTP data link. Subsequently, the access device monitors the port, encapsulates the FTP packet from the port into the OAM packet, and sends the OAM packet to the FTP client according to the corresponding relationship between the port and the client MEP address; and receives the OAM packet of the FTP client, parses the TLV field of the OAM packet to obtain the FTP packet, encapsulates the FTP packet, and sends the packet to the FTP server device over the data link.

It should be noted that before the access device is used as a proxy to transmit the FTP data packet, a corresponding relationship needs to be created first between the FTP data port (that is, the port N+1) and the MEP address created on the client, and therefore, after receiving the corresponding FTP packet, the access device can encapsulate and send the corresponding OAM packet to the client MEP. The specific time of creating the corresponding relationship may be any time before the transmission of the FTP data packet begins. In FIG. 5, the time of mapping the port N+1 to a serving port of the FTP protocol of the client that does not have an IP address is only an example. The corresponding relationship may also be created before the entire procedure begins. Further, the creation of the corresponding relationship through mapping may be a step of triggering the procedure. Of course, if the corresponding relationship already exists, this step is omissible.

In addition, a corresponding relationship may also be created between the port N used by the command link and the MEP address of the FTP client, which enables the access client to use the same method to send the FTP packet from the command link to the FTP client and send the FTP packet from the FTP client to the FTP server. It should be noted that, if the corresponding relationship between the command port N and the MEP address and the corresponding relationship between the data port N+1 and the MEP address are created at the same time, the OAM packet from the FTP client should include corresponding identifiers for distinguishing, so that the access device can process the corresponding FTP packet correctly.

The above description is about an FTP active mode. An FTP passive mode is similar, in which the access device receives a packet from the FTP client that does not have an IP address, where a TLV field of the packet carries an FTP passive mode command. The access device encapsulates the passive mode command, and sends it to the FTP server over a created FTP command link. The access device receives a packet returned as a response from the FTP server, where the packet carries a data port number. The access device encapsulates the packet into the TLV field of the OAM packet, and sends it to the client. The client parses the OAM packet to obtain the packet, sends the packet to an FTP protocol stack, obtains the data port number, and encapsulates the data port number and sends it to the access device. After receiving the OAM packet encapsulated with the data port number from the client, the access device creates an FTP data link by using the data port number and a local port number as an FTP server port number and an FTP client port number respectively, and by using the Internet Protocol IP address of the access device as the FTP client IP address. The local port number is equal to the port number used by the command link plus 1. It should be noted that the PASV sent by the client to the access device carries the IP address of the FTP server, where the IP address may be notified by the access device to the client by using the OAM packet or previously stored by the client. Specifically, the embodiments of the present invention do not limit how to trigger the client to send the PASV command, that is, the passive mode command. The corresponding relationship between the port at the access device and the MEP address on the client is the same as that of the active mode FTP, and is not described repeatedly here any further.

By using a fixed mapping relationship between the transport layer protocol port and the device that does not have an IP address and by encapsulating and decapsulating an Ethernet OAM packet, the server in the IP network can access the device that does not have an IP address and is connected to the access device, so that the device that does not have an IP address can load data or programs remotely and make a backup of local data on the server.

In another scenario, according to the embodiments of the present invention, a user equipment in the IP network can access the device that does not have an IP address and is connected to the access device, and perform SNMP-based remote management on the device that does not have an IP address.

Figure 7:
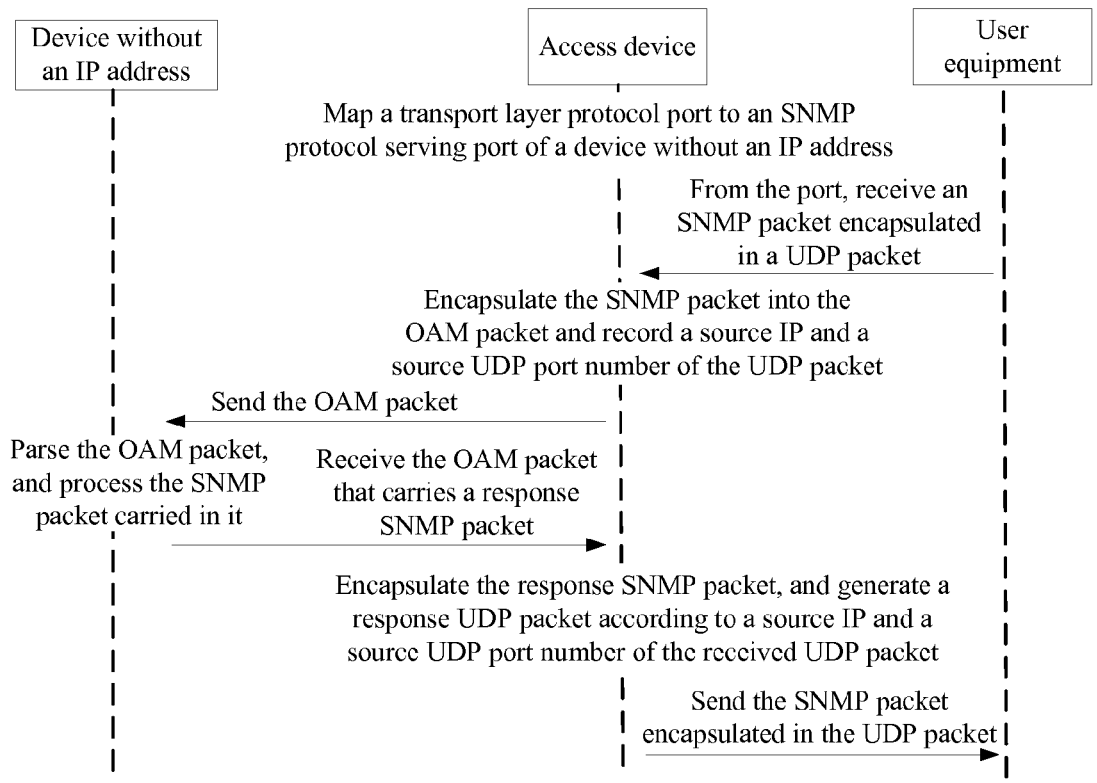
FIG. 7 is a signaling interaction diagram for implementing the SNMP protocol according to an embodiment of the present invention.

Specifically, as shown in FIG. 7, the access device maps the transport layer protocol port to an SNMP protocol serving port of the device that does not have an IP address; monitors the port, receives an SNMP packet sent from the user equipment by using this port, where the SNMP packet is encapsulated in a UDP packet, encapsulates the SNMP packet into the OAM packet, and records a sequence number of the OAM packet and a corresponding relationship between a source IP and a source UDP port number of the UDP packet; and sends the OAM packet to the device that does not have an IP address. After receiving the OAM packet, the device that does not have an IP address processes the SNMP packet carried in the OAM packet and makes a response, and encapsulates the response SNMP packet into the OAM packet. After receiving the corresponding OAM packet, the access device parses the OAM packet to obtain the response SNMP packet, finds the source IP and the source UDP port of the corresponding UDP packet according to the sequence number of the OAM packet, encapsulates the SNMP packet into a UDP packet, and sends the UDP packet to the user equipment. Of course, when no response is required from the device that does not have an IP address, it is not necessary to record the source port number and the source IP address of the corresponding UDP packet. Optionally, after receiving the UDP packet, the access device may create a corresponding relationship between the OAM packet and the source IP address as well as the source port of the UDP packet, where the OAM packet is used to encapsulate the SNMP packet carried in the UDP. In this way, the UDP packet, in which the response SNMP packet is encapsulated, can be sent to the source IP address and the source port after the response OAM packet is received. Optionally, a mapping relationship may be created between the source IP address as well as the source port number and the MEP address on the device that does not have an IP address, so that the access device can encapsulate the response OAM packet from the MEP directly according to the mapping relationship and send the packet to the user equipment.

By using a fixed mapping relationship between the transport layer protocol port and the device that does not have an IP address and by encapsulating and decapsulating an Ethernet OAM packet, the user equipment in the IP network can access the device that does not have an IP address and is connected to the access device, and perform SNMP-based remote management on the device that does not have an IP address.

Further, an embodiment of the present invention provides a communication apparatus, where the communication apparatus is used to implement the communication method described above. The corresponding implementation method of the communication apparatus is consistent with the communication method.

Figure 8:
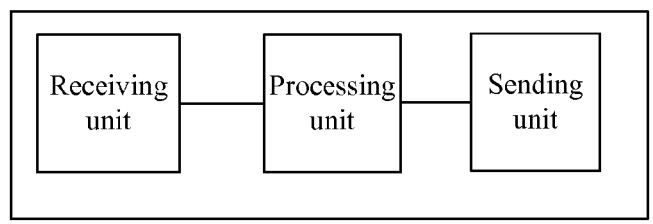
FIG. 8 is a structural diagram of a communication apparatus according to an embodiment of the present invention.

As shown in FIG. 8, the communication apparatus includes: a receiving unit, configured to receive a packet; a processing unit, configured to: receive a first packet that carries a port number corresponding to a stored Ethernet maintenance entity group end point MEP address, where the first packet is a transport layer protocol packet from the receiving unit; encapsulate a part or all of content of the first packet into a second packet, where the port number is a port number of a destination port of the first packet, and the second packet is an Ethernet operation, administration and maintenance OAM packet; and set a destination address of the second packet as the MEP address according to the port number and a corresponding relationship between the MEP address and the port number; and a sending unit, configured to send the packet that comes from the processing unit. The apparatus supports the Ethernet OAM functions and the corresponding transport layer protocol.

The corresponding relationship between the MEP address and a protocol port may be direct, that is, a Media Access Control (Media Access Control, MAC) address of the MEP corresponds to the protocol port directly; or, the corresponding relationship may be indirect, for example, the protocol port corresponds to a MEP identifier, and the MEP identifier corresponds to a MAC address of the MEP. The MEP identifier may be one of the following or any combination thereof: a MEP sequence number, a MEP identity, a VLAN identifier, and other MEP identifiers. In summary, the communication apparatus may use the identifier to identify the MEP, and use the identifier to obtain the destination address that should be written in the packet destined for the MEP. That is, this identifier is unique to the communication apparatus, and corresponds to the MAC address of the MEP. It should be noted that the MAC address may be a MAC address of a port of an apparatus where the MEP is located, or may be a multicast or broadcast address.

The encapsulation mentioned in the embodiment of the present invention refers to encapsulating desired content into an idle field or a custom field of the OAM packet. Preferably, the desired content may be encapsulated into a type, length, value TLV field of the OAM packet.

The processing unit receives the first packet from the transport layer protocol port. In other words, the packet received by the processing unit carries the port number of the transport layer protocol port, and the port is mapped to a serving port of a device that does not have an IP address and is connected to the apparatus. That is, if the port number of the port is in a corresponding relationship with a MEP address of a device that does not have an IP address, where the MEP address is stored in the apparatus, the first packet that carries the corresponding port number is encapsulated. Optionally, a corresponding socket may be created to implement the foregoing function, monitor the mapped transport layer protocol port, and correspondingly process the packet received from the port.

The processing unit is further configured to create the corresponding relationship between the MEP address and the port number. Alternatively, the processing unit is further configured to create a corresponding relationship between the MEP address and a stored MEP identifier, and create a corresponding relationship between the MEP identifier and the port number. The process of creating the corresponding relationship may be reflected by creating and storing one or more corresponding relationship tables.

Optionally, the processing unit is further configured to encapsulate a part or all of content of a third packet in response to the second packet into a fourth packet, and set a destination address of the fourth packet as a source address of the first packet. The processing unit may determine a response packet based on the property of the OAM packet. For example, if the sent packet is an LBM packet, the response packet is an LBR packet. Alternatively, whether the packet is a response packet may also be determined based on a sequence number of the packet.

In this embodiment, the first packet refers to a packet sent over a transport layer protocol in a communication network. The second packet is a packet sent by the communication apparatus in this embodiment to the apparatus that does not have an IP address and is connected to the communication apparatus, where the apparatus that does not have an IP address is the apparatus where the MEP is located corresponding to the stored MEP address. The third packet is a packet sent by the apparatus that does not have an IP address as a response to the communication apparatus in this embodiment after the apparatus that does not have an IP address receives the second packet. After receiving the third packet, the communication apparatus in this embodiment generates a fourth packet, and sends the fourth packet as a response to the network apparatus that sends the first packet. Optionally, before the packet is encapsulated, the processing unit may determine the type of the packet first. If the type of the packet is preset, the packet is encapsulated and sent. For example, the preset packet may be a Telnet packet, or an SNMP packet, or an FTP packet. If the type of the packet is not preset, the packet is processed in other ways.

Specifically, if the packet to be processed is an FTP packet, the processing unit may be further configured to obtain a data port number from an OAM packet from the receiving unit, and create an FTP data link by using the data port number and the port number as an FTP server port number and an FTP client port number respectively.

Specifically, the apparatus may be a network device such as a digital subscriber line access multiplexer (Digital Subscriber Line Access Multiplexer, DSLAM), a switch, or an optical line terminal (optical line terminal, OLT).

Further, an embodiment of the present invention further provides a communication apparatus, where the communication apparatus is used to implement the communication method described above. The corresponding implementation method of the communication apparatus is consistent with the communication method.

Figure 9:
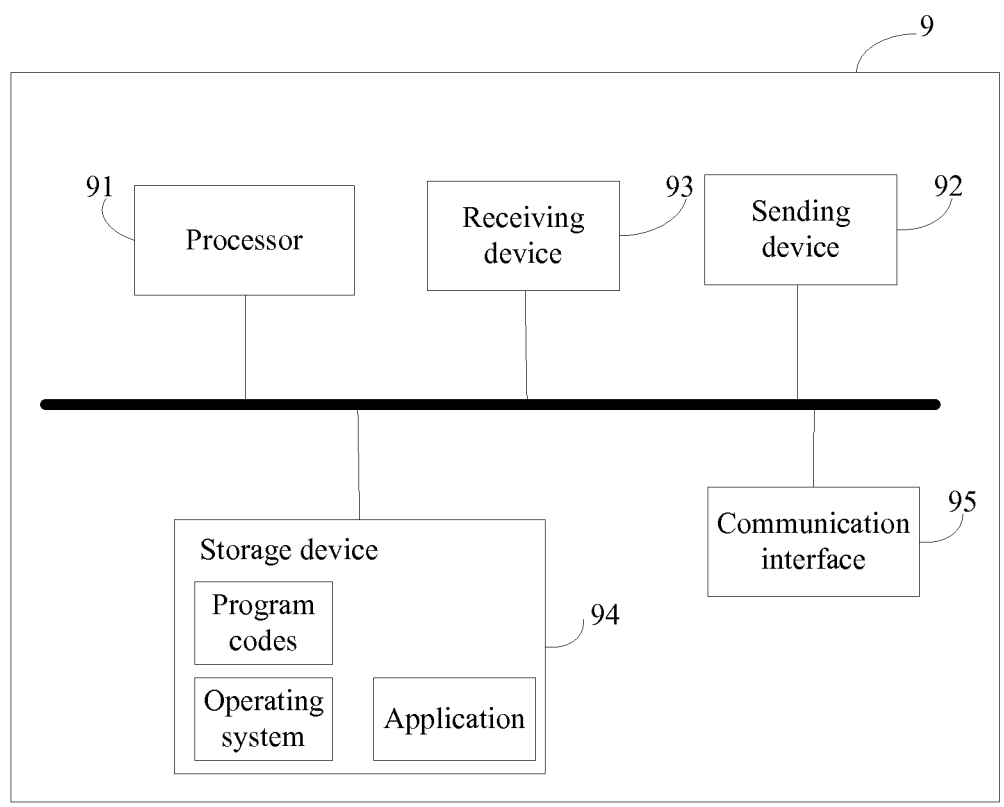
FIG. 9 is a structural diagram of another communication apparatus according to an embodiment of the present invention.

As shown in FIG. 9, the apparatus includes one or more receiving devices 93, configured to receive a packet. A a processor 91 is coupled with one or more receiving devices 93 and is configured to: receive a first packet that carries a port number corresponding to a stored Ethernet maintenance entity group end point MEP address, where the first packet is a transport layer protocol packet from the one more multiple receiving devices 93; encapsulate a part or all of content of the first packet into a second packet, where the port number is a port number of a destination port of the first packet, and the second packet is an Ethernet operation, administration and maintenance OAM packet; and set a destination address of the second packet as the MEP address according to the port number and a corresponding relationship between the MEP address and the port number; and one or more sending devices 92 coupled with the processor 91, configured to send the packet that comes from the processor 91.

FIG. 9 only gives an example of one receiving device 93 and one sending device 92, and there may be a plurality of receiving devices and a plurality of sending devices, which is not limited by the embodiment of the present invention. A communication interface 95 is configured to connect the communication apparatus and the communication network and other devices. The steps performed by the processor 91 may be configured in corresponding hardware. For example, the processor 91 may be specifically reflected by utilization of a field programmable gate array (FPGA), and therefore, a memory 94 is optional. Of course, in most circumstances, the communication apparatus is equipped with a storage device. The storage device stores corresponding program code, operating system, and applications. The processor 91 executes the stored programs to implement the following functions: receiving a first packet that carries a port number corresponding to a stored Ethernet maintenance entity group end point MEP address, where the first packet is a transport layer protocol packet from the one or more receiving devices 93; encapsulating a part or all of content of the first packet into a second packet, where the port number is a port number of a destination port of the first packet, and the second packet is an Ethernet operation, administration and maintenance OAM packet; and setting a destination address of the second packet as the MEP address according to the port number and a corresponding relationship between the MEP address and the port number.

The encapsulation mentioned in the embodiment of the present invention refers to encapsulating desired content into an idle field or a custom field of the OAM packet. Preferably, the desired content may be encapsulated into a type, length, value TLV field of the OAM packet.

The corresponding relationship between the MEP address and the protocol port may be direct, that is, a Media Access Control (MAC) address of the MEP corresponds to the protocol port directly; or, the corresponding relationship may be indirect, for example, the protocol port corresponds to a MEP identifier, and the MEP identifier corresponds to a MAC address of the MEP. The MEP identifier may be one of the following or any combination thereof: a MEP sequence number, a MEP identity, a VLAN identifier, and other MEP identifiers. In summary, the communication apparatus may use the identifier to identify the MEP, and use the identifier to obtain the destination address that should be written in the packet destined for the MEP. That is, this identifier is unique to the communication apparatus, and corresponds to the MAC address of the MEP. It should be noted that the MAC address may be a MAC address of a port of an apparatus where the MEP is located, or may be a multicast or broadcast address.

The processor 91 is further configured to create the corresponding relationship between the MEP address and the port number. Alternatively, the processor 91 is further configured to create a corresponding relationship between the MEP address and a stored MEP identifier, and create a corresponding relationship between the MEP identifier and the port number. The process of creating the corresponding relationship may be reflected by creating and storing one or more corresponding relationship tables.

The processor 91 receives the first packet that comes from the receiving device and carries the port number corresponding to the stored MEP address. Specifically, the packet received from the communication apparatus carries the port number of the transport layer protocol port, and the port is mapped to a serving port of a device that does not have an IP address and is connected to the apparatus. That is, if the port number of the port is in a corresponding relationship with a MEP address of a device that does not have an IP address, where the MEP address is stored in the communication apparatus, the first packet that carries the corresponding port number is encapsulated. Optionally, a corresponding socket may be created to implement the foregoing function, monitor the mapped transport layer protocol port, and correspondingly process the packet received from the port.

Optionally, the processor 91 is further configured to encapsulate a part or all of content of a third packet in response to the second packet into a fourth packet, and set a destination address of the fourth packet as a source address of the first packet. The processor 91 may determine a response packet based on the property of the OAM packet. For example, if the sent packet is an LBM packet, the response packet is an LBR packet. Alternatively, whether the packet is a response packet may also be determined based on a sequence number of the packet.

Optionally, before the packet is encapsulated, the processor 91 may determine the type of the packet first. If the type of the packet is preset, the packet is encapsulated and sent. For example, the preset packet may be a Telnet packet, or an SNMP packet, or an FTP packet. If the type of the packet is not preset type, the packet is processed in other ways.

Specifically, if the packet to be processed is an FTP packet, the processor 91 may be further configured to obtain a data port number from an OAM packet from the receiving unit, and create an FTP data link by using the data port number and the port number as an FTP server port number and an FTP client port number respectively.

Optionally, the processor 91 is further configured to create a corresponding relationship between the stored MEP address and the protocol port number. The processor 91 may initiate creation of the corresponding relationship after receiving a command sent by another device, or may initiate the creation actively. The corresponding relationship may be stored in advance, or may even be static and need no configuration. More specifically, the processor 91 may create a socket, and create a corresponding relationship between the socket and the stored MEP address, where the socket corresponds to the corresponding transport layer protocol port.

Specifically, the apparatus may be a network device such as a digital subscriber line access multiplexer (DSLAM), a switch, or an optical line terminal (OLT).

Further, an embodiment of the present invention provides a communication system, where the communication system includes a first apparatus, a second apparatus, and a third apparatus, and the first apparatus is connected to the third apparatus through the second apparatus.

The second apparatus is configured to: receive a first packet that carries a port number corresponding to a stored Ethernet maintenance entity group end point MEP address, where the first packet is a transport layer protocol packet from the third apparatus, and the port number is a port number of a destination port of the first packet; encapsulate a part or all of content of the first packet into a second packet, where the second packet is an Ethernet operation, administration and maintenance OAM packet; and send the second packet to the first apparatus according to the port number and a corresponding relationship between the MEP address and the port number;

and the first apparatus is configured to receive the second packet and obtain the content encapsulated in the second packet.

Optionally, the second apparatus is further configured to create the corresponding relationship between the MEP address and the port number according to an instruction from the third apparatus before the second apparatus receives the first packet from the third apparatus.

Optionally, the second apparatus is further configured to create a corresponding relationship between the MEP address and a stored MEP identifier, and create a corresponding relationship between the MEP identifier and the port number. Specifically, the second apparatus may create a socket according to an instruction from the third apparatus, and create a corresponding relationship between the socket and the MEP address, where the socket corresponds to the port number.

Optionally, the first apparatus is further configured to return a third packet as a response according to the content encapsulated in the second packet, where the third packet is an Ethernet OAM packet; and the second apparatus is further configured to encapsulate a part or all of content of the third packet into a fourth packet, and send the fourth packet to the third apparatus.

Optionally, the first packet carries a Telnet protocol Telnet packet or carries a Simple Network Management Protocol SNMP packet.

Optionally, the first packet carries a File Transfer Protocol FTP packet; the second apparatus is further configured to send a fifth packet carrying the port number and an Internet Protocol IP address of the third apparatus to the first apparatus, where the fifth packet is an OAM packet; receive a sixth packet carrying an FTP active mode command from the first apparatus, where the sixth packet is an OAM packet; and encapsulate the active mode command into a seventh packet, and send the seventh packet to the third apparatus over a created FTP command link; the first apparatus is further configured to generate the active mode command according to the port number and the IP address of the third apparatus in the fifth packet, and encapsulate the active mode command into the sixth packet, where the active mode command includes the port number; and the third apparatus is configured to create an FTP data link according to the active mode command in the seventh packet by using the port number as an FTP client port number and using an IP address of the second apparatus as an FTP client IP address.

Optionally, the first packet carries a File Transfer Protocol FTP packet; the second apparatus is further configured to receive an eighth packet carrying an FTP passive mode command from the first apparatus, where the eighth packet is an OAM packet; encapsulate the passive mode command into a ninth packet, and send the ninth packet to the third apparatus over a created FTP command link; receive a tenth packet returned as a response from the third apparatus, where the tenth packet carries a data port number; encapsulate the tenth packet into an eleventh packet, and send the eleventh packet to the first apparatus; receive a twelfth packet returned as a response from the first apparatus, and obtain the data port number from the twelfth packet; and create an FTP data link by using the data port number and the port number as an FTP server port number and an FTP client port number respectively, and by using an IP address of the second apparatus as an FTP client IP address. The first apparatus is further configured to obtain the tenth packet from the eleventh packet, obtain the data port number from the tenth packet, and encapsulate the data port number into the twelfth packet and send it to the second apparatus.

By creating a corresponding relationship between a transport layer protocol port and a MEP address on a device that does not have an IP address and is connected to a communication apparatus, and by using an OAM packet to carry an application layer packet, the communication method, the communication apparatus, and the communication system provided by the embodiments of the present invention implement IP address-based communication and management for a device that does not have an IP address and is connected to an access device.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication method adapted for a communication system that includes a first apparatus, a second apparatus, and a third apparatus, the communication method comprising:
   receiving, by the second apparatus, a first packet that carries a port number corresponding to an Ethernet maintenance entity group end point (MEP) address, wherein the first apparatus is connected to the third apparatus through the second apparatus, wherein the first packet is a transport layer protocol packet from the third apparatus, wherein the port number is a port number of a destination port of the first packet, and wherein the MEP address is a MEP address of a MEP on the first apparatus;
   encapsulating, by the second apparatus, a part or all of content of the first packet into a second packet, wherein the second packet is an Ethernet operation, administration and maintenance (OAM) packet; and
   sending, by the second apparatus, the second packet to the MEP on the first apparatus according to the port number and a corresponding relationship between the MEP address and the port number.

2. The communication method according to claim 1, wherein the communication method further comprises:
   before receiving the first packet, creating, by the second apparatus, the corresponding relationship between the MEP address and the port number.

3. The communication method according to claim 2, wherein creating, by the second apparatus, the corresponding relationship between the MEP address and the port number comprises:
   creating, by the second apparatus, a corresponding relationship between the MEP address and a MEP identifier of the MEP; and
   creating, by the second apparatus, a corresponding relationship between the MEP identifier and the port number.

4. The communication method according to claim 1, wherein the communication method further comprises:
  receiving, by the second apparatus, a third packet returned as a response from the first apparatus, wherein the third packet is an Ethernet OAM packet; and
  encapsulating, by the second apparatus, a part or all of content of the third packet into a fourth packet, and sending the fourth packet to the third apparatus.

5. The communication method according to claim 1, wherein the first packet carries a Telnet protocol Telnet packet or carries a Simple Network Management Protocol SNMP packet.

6. The communication method according to claim 1, wherein the first packet carries a File Transfer Protocol (FTP) packet, and wherein before the second apparatus receives the first packet from the third apparatus, the communication method further comprises:
  sending, by the second apparatus, a fifth packet carrying the port number and an IP address of the third apparatus to the first apparatus, wherein the fifth packet is an OAM packet;
  receiving, by the second apparatus, a sixth packet carrying an FTP active mode command from the first apparatus, wherein the sixth packet is an OAM packet, and wherein the active mode command comprises the port number and the IP address of the third apparatus;
  encapsulating, by the second apparatus, the active mode command into a seventh packet; and
  sending the seventh packet to the third apparatus over a created FTP command link, so as to create an FTP data link.

7. The communication method according to claim 1, wherein the first packet carries a File Transfer Protocol (FTP) packet, and wherein before the second apparatus receives the first packet from the third apparatus, the communication method further comprises:
  receiving, by the second apparatus, an eighth packet carrying an FTP passive mode command from the first apparatus, wherein the eighth packet is an OAM packet;
  encapsulating, by the second apparatus, the passive mode command into a ninth packet;
  sending, by the second apparatus, the ninth packet to the third apparatus over a created FTP command link;
  receiving, by the second apparatus, a tenth packet returned as a response from the third apparatus, wherein the tenth packet carries a data port number, and wherein the tenth packet is an FTP packet;
  encapsulating, by the second apparatus, the tenth packet into an eleventh packet;
  sending the eleventh packet to the first apparatus, wherein the eleventh packet is an OAM packet;
  receiving, by the second apparatus, a twelfth packet returned as a response from the first apparatus, and obtaining the data port number from the twelfth packet, wherein the twelfth packet is an OAM packet; and
  creating, by the second apparatus, an FTP data link by using the data port number and the port number as an FTP server port number and an FTP client port number respectively, and by using an Internet Protocol IP address of the second apparatus as an FTP client IP address.

8. A communication apparatus, comprising:
  one or more receiving devices configured to receive packets;
  a processor coupled to the one or more receiving devices, the processor configured to:
    receive a first packet that carries a port number corresponding to a stored Ethernet maintenance entity group end point (MEP) address, wherein the first packet is a transport layer protocol packet from the one or more receiving devices, and the port number is a port number of a destination port of the first packet; encapsulate a part or all of content of the first packet into a second packet, wherein the second packet is an Ethernet operation, administration and maintenance (OAM) packet; and set the MEP address as the destination address of the second packet according to the port number and a corresponding relationship between the MEP address and the port number; and
  one or more sending devices coupled to the processor, configured to send packets that come from the processor.

9. The communication apparatus according to claim 8, wherein the processor is further configured to create the corresponding relationship between the MEP address and the port number.

10. The communication apparatus according to claim 9, wherein the processor is further configured to create a corresponding relationship between the MEP address and an MEP identifier, and to create a corresponding relationship between the MEP identifier and the port number.

11. The communication apparatus according to claim 8, wherein the processor is further configured to encapsulate a part or all of content of a third packet in response to the second packet into a fourth packet, and to set the source address of the first packet as the destination address of the fourth packet.

12. The communication apparatus according to claim 8, wherein the first packet carries a Telnet protocol Telnet packet or carries a Simple Network Management Protocol packet.

13. The communication apparatus according to claim 8, wherein the first packet carries a File Transfer Protocol (FTP) packet, and
  wherein the processor is further configured to obtain a data port number from an OAM packet from the one or more receiving devices, and to create an FTP data link by using the data port number and the port number as an FTP server port number and an FTP client port number respectively.

14. A communication system comprising:
  a plurality of apparatuses including at least a first apparatus, a second apparatus, and a third apparatus, wherein the first apparatus is connected to the third apparatus through the second apparatus,
  wherein the second apparatus is configured to:
  receive a first packet that carries a port number corresponding to a stored Ethernet maintenance entity group end point (MEP) address, wherein the first packet is a transport layer protocol packet from the third apparatus, and the port number is a port number of a destination port of the first packet;
  encapsulate a part or all of content of the first packet into a second packet, wherein the second packet is an Ethernet operation, administration and maintenance (OAM) packet; and
  send the second packet to the first apparatus according to the port number and a corresponding relationship between the MEP address and the port number, and
  wherein the first apparatus is configured to receive the second packet, and to obtain the content encapsulated in the second packet.

15. The communication system according to claim 14, wherein the second apparatus is further configured to create the corresponding relationship between the MEP address and the port number according to an instruction from the third apparatus before the second apparatus receives the first packet from the third apparatus.

16. The communication system according to claim 14, wherein the second apparatus is further configured to create a corresponding relationship between the MEP address and a stored MEP identifier according to an instruction from the third apparatus, and to create a corresponding relationship between the MEP identifier and the port number according to the instruction from the third apparatus.

17. The communication system according to claim 14, wherein the first apparatus is further configured to return a third packet as a response according to the content encapsulated in the second packet, wherein the third packet is an Ethernet OAM packet, and
 wherein the second apparatus is further configured to encapsulate a part or all of content of the third packet into a fourth packet, and to send the fourth packet to the third apparatus.

18. The communication system according to claim 14, wherein the first packet carries a Telnet protocol Telnet packet or carries a Simple Network Management Protocol packet.

19. The communication system according to claim 14, wherein the first packet carries a File Transfer Protocol (FTP) packet,
 wherein the second apparatus is further configured to: send a fifth packet carrying the port number and an Internet Protocol IP address of the third apparatus to the first apparatus, wherein the fifth packet is an OAM packet; receive a sixth packet carrying an FTP active mode command from the first apparatus, wherein the sixth packet is an OAM packet; encapsulate the active mode command into a seventh packet; and send the seventh packet to the third apparatus over a created FTP command link,
 wherein the first apparatus is further configured to generate the active mode command according to the port number and the IP address of the third apparatus in the fifth packet, and to encapsulate the active mode command into the sixth packet, wherein the active mode command comprises the port number and IP address, and
 wherein the third apparatus is configured to create an FTP data link according to the active mode command in the seventh packet by using the port number as an FTP client port number and using an IP address of the second apparatus as an FTP client IP address.

20. The communication system according to claim 14, wherein the first packet carries a File Transfer Protocol (FTP) packet,
 wherein the second apparatus is further configured to: receive an eighth packet carrying an FTP passive mode command from the first apparatus, wherein the eighth packet is an OAM packet; encapsulate the passive mode command into a ninth packet; send the ninth packet to the third apparatus over a created FTP command link; receive a tenth packet returned as a response from the third apparatus, wherein the tenth packet carries a data port number; encapsulate the tenth packet into an eleventh packet; send the eleventh packet to the first apparatus; receive a twelfth packet returned as a response from the first apparatus; obtain the data port number from the twelfth packet; and create an FTP data link by using the data port number and the port number as an FTP server port number and an FTP client port number respectively, and by using an IP address of the second apparatus as an FTP client IP address, and
 wherein the first apparatus is further configured to obtain the tenth packet from the eleventh packet, to obtain the data port number from the tenth packet, to encapsulate the data port number into the twelfth packet, and to send the twelfth packet to the second apparatus.

* * * * *